United States Patent
Bennett et al.

[11] Patent Number: 6,123,353
[45] Date of Patent: Sep. 26, 2000

[54] METHOD OF JOINING AND REINFORCING MOLDED PLASTIC BICYCLE FRAMES

[75] Inventors: Richard A. Bennett, Smithtown; Robert L. Benoit, Oakdale; William F. Fahey, Kings Park; Bernard I. Rachowitz; Glenn L. Spacht, both of Lloyd Neck, all of N.Y.

[73] Assignee: Techmatics, Inc., Hauppauge, N.Y.

[21] Appl. No.: 08/808,944

[22] Filed: Feb. 19, 1997

[51] Int. Cl.[7] .......................... B62K 19/02; B62K 19/16; B62K 19/30

[52] U.S. Cl. ...................................... 280/281.1; 280/288.3

[58] Field of Search ................................ 280/274, 281.1, 280/288, 288.2, 288.3, 797, 798; 52/732.1, 735.1

[56] References Cited

U.S. PATENT DOCUMENTS

| | | |
|---|---|---|
| 1,242,892 | 10/1917 | Wagner . |
| 3,753,326 | 8/1973 | Kaufman, Sr. . |
| 4,548,422 | 10/1985 | Michel et al. . |
| 4,550,927 | 11/1985 | Resele . |
| 5,011,172 | 4/1991 | Bellanca et al. .................. 280/281.1 |
| 5,464,240 | 11/1995 | Robinson et al. . |
| 5,762,352 | 6/1998 | Lee ..................................... 280/280 |

FOREIGN PATENT DOCUMENTS

| | | | |
|---|---|---|---|
| 475337 | 4/1915 | France ............................. 280/288.3 |

*Primary Examiner*—Anne Marie Boehler
*Attorney, Agent, or Firm*—Darby & Darby

[57] ABSTRACT

A method of forming a tubular frame, e.g., a bicycle frame, from two substantially symmetrical frame-halves utilizes a plurality of interconnected half-tubular elements. Each half-tubular element has an exterior surface, an interior surface, and longitudinal edges that extend between the exterior and interior surfaces in the direction of the longitudinal axis of the half-tubular element. The surfaces of the longitudinal edges of the half-tubular elements are shaped such that corresponding edges of corresponding half-tubular elements in the left and right half-frames may easily be interengaged, and adjusted along the respective longitudinal axes of the half-tubular elements that are being joined. Preferably, the longitudinal free edges are stepped in the radial direction such that each level is substantially planar and smooth along the respective longitudinal axis of the half-tubular element. The longitudinal edge of one of the half-tubular elements may include parallel steps extending in opposite directions to thereby form a groove into which a step of the corresponding longitudinal edge of the corresponding half-tubular element in the other half-frame may be inserted. The latter joint type provides additional reinforcement of the connection of the half-frames. Further reinforcement in the stay area of the bicycle frame may be provided, either in the form of a reinforcement arch positioned within the tubular legs of the stays, or in the form of a one-piece, unitary inner stay element positioned between the outer stay elements that are part of the frame-halves.

6 Claims, 4 Drawing Sheets

METHOD OF JOINING AND REINFORCING MOLDED PLASTIC BICYCLE FRAMES

BACKGROUND OF THE INVENTION

The present invention relates to a method of joining and reinforcing molded frames. More particularly, the present invention relates to a method of joining molded halves of a bicycle frame without requiring alignment elements on the frame halves, yet providing a sturdy connection between the frame halves. The present invention further relates to a method of reinforcing high stress areas in a bicycle frame formed from molded frame halves.

Bicycle frames generally are formed from substantially hollow tubular frame elements connected together in a manner depending on the material and manner of formation of the tubular elements. When the tubular elements are formed from a lightweight metal, such as aluminum, the metal is generally cast into a single-piece tubular element. Several such tubular elements are connected together, such as by welding or gluing, to form the frame of the bicycle. When the tubular elements are formed from a fiber-reinforced plastic or composite material, the elements typically are adhesively bonded into lugs. Alternatively, composite lugs may be formed over the pre-fabricated composite tubular elements. Because all of the tubular elements must be joined together to form the finished bicycle, formation of a bicycle frame from tubular elements is rather labor intensive. Additionally, the lugs or joints with which the tubular elements are joined must be relatively thick and heavy in order to provide a secure connection between the elements.

A method that eliminates the use of multiple parts that must be joined to form a finished bicycle frame involves the formation of an inflation-cured, one-piece hollow shell. This method uses composite materials typically composed of structural fibers (such as carbon fiber and fiberglass) and thermoset resins (such as epoxy) which are placed around an inflatable bladder (formed from materials such as a nylon film) or an expandable material (such as a heat-expandable foam). The assembly is placed in a cavity mold and either the bladder is inflated or the heat applied to cure the thermoset resin causes the expandable material to expand. The fiber and resin are thus pressed by the expanding base structure (the bladder or expandable material) against the cavity mold walls and thereby conformed to the shape of the mold during the curing of the resin. Once curing is complete, the mold is opened and the frame is removed, with the bladder or expandable material permanently remaining on the interior walls of the frame. Because the fibers are only strong in the fiber direction (either one or two directions, depending on the fiber tape or cloth available), several fiber layers, each having a different directional orientation, must be used in order to result in the desired frame structural strength. The resulting wall thickness is relatively thick, particularly in bent or angled areas (generally at the areas where joints are used in a frame formed from several tubular elements), and the frame is thus heavy, even though relatively heavy lugs or joints are not used. Because the frame remains in the mold for several hours (making the mold unavailable for use in forming another frame), and several layers must be applied, production costs typically are more expensive than for joined-tubing frames. Moreover, the frames are typically brittle and subject to cracking from use and may shatter on impact.

A bicycle frame that avoids many of the above-described disadvantages of prior art frames is formed from two molded partial shells that are joined to form a hollow finished frame. Such molded elements are typically formed from a material, such as plastic or carbon fiber, that is molded into open-sided halves because of the molding process. Each half has a plurality of interconnected half-tubes, each half-tube having a pair of substantially parallel longitudinal free edges extending along the longitudinal axis of the respective half-tube. The two half-frames are connected together, such as by gluing, along the free edges to form the completed, formed frame of the bicycle.

The longitudinal free edges of bicycle half-frames are typically provided with alignment elements that facilitate alignment of the half-frames so that the exterior of the formed frame is substantially smooth. Such alignment elements may include pins in one half and corresponding receiving holes in the other half, such as shown in U.S. Pat. No. 5,464,240 to Robinson et al. These alignment elements are rather small because of the thinness of the walls of the tubular elements, and thus are relatively difficult to manufacture without defects. Occasionally there are manufacturing defects that result in too many pins or not enough holes. In that case, the additional pins must be cut off, thus requiring yet another assembly step. Moreover, alignment of the frame halves requires the additional step of aligning the relatively small pins with their corresponding holes. Such alignment is time consuming and therefore labor intensive. Another disadvantage of using small pins is that they may break before or during alignment.

Typically, half-frames of a bicycle are glued together at their adjoining longitudinal free edges to form a glued butt joint. When the halves are joined and pressed together, the glue spreads along the edges, as usual. The glue often extends past the abutting edges to the exterior of the tubes (the rounded exterior of the frame visible to the consumer/user). In order to create a neater appearance, the exterior of the now joined frame halves must be cleaned or smoothed to improve the appearance of the frame. The frame can then be painted in the usual manner.

Bicycles frames that are formed from molded half-frames also typically include internal reinforcements, such as the protrusions or webs and corresponding slots shown in the above-mentioned Robinson Patent. As with the pins and holes, the internal reinforcements also make manufacture of the halves, and their connection to each other, more complicated. Moreover, although such reinforcement elements add to the strength of the frame, they also add to the weight of the frame, thereby making the bicycle heavier and thus more difficult to ride.

Another reinforcement element that may be provided is a reinforcement "box." Reinforcement boxes may be formed as substantially tubular elements that extend from the interior surface of a frame half for connection with a corresponding box in a corresponding frame half. Preferably, the box has a longitudinal axis that is substantially perpendicular to the longitudinal axis of the half-tubular element of the frame half from which the box extends, and thus the connected corresponding boxes form a reinforcing element that is substantially perpendicular to the plane of the completed frame. A reinforcement box may be provided at any desired location. Typically, a box is at least provided in the chain stay area and in the seat stay area adjacent the adjoining tubes (i.e., the bottom bracket shell and seat tube, respectively). Provision of such a box strengthens the tubular frame. However, the chain stay and seat stay areas are generally subjected to substantial stresses, and thus are prone to having cracking problems despite the provision of boxes. Reinforcements in addition to the boxes are thus recommended. However, the additional reinforcements used in known bicycle frames add to manufacturing costs and the weight of the frame.

SUMMARY OF THE INVENTION

It is therefore an object of the present invention to provide a structure for joining molded half-frames of a tubular frame in a manner that is relatively simple and not labor intensive, such that assembly of the frame is simple and cost effective.

It is a related object of the present invention to provide a method of joining molded half-frames of a tubular frame that permits use of half-frames that are easy and relatively inexpensive to manufacture.

It is a further related object of the present invention to provide a method of joining molded half-frames of a bicycle frame that does not require labor intensive finishing steps once the half-frames are joined.

It is another object of the present invention to provide a method of joining molded half-frames of a bicycle frame in a manner that reduces the number of finishing steps required between joining the frame halves and painting the joined bicycle frame halves.

It is yet another object of the present invention to provide a method of reinforcing molded half-frames of a bicycle frame individually, and also reinforcing the half-frames once joined, to form a complete frame that is relatively easy and inexpensive both to manufacture and work with during assembly of the bicycle frame.

It is another related object of the present invention to provide a bicycle formed from joined half-frames that are formed and joined to result in a lightweight frame.

In accordance with the principles of the present invention, a method of joining and reinforcing molded half-frames of a tubular frame, e.g., a bicycle frame, is provided. This method simplifies the joining of the frame halves. Also, the design and shape of the frame halves are also simplified, such that the manufacture of the frame halves is easier and thus less costly. In particular, the longitudinally extending free edges of the halves (i.e., the edges of the half-tubular elements that abut each other upon connecting the frame halves together) preferably are stepped, each step having a substantially planar, smooth surface along the longitudinal axis of its respective tubular element. If desired, at least one of the longitudinally extending free edges of one of the halves may be formed as a groove, the corresponding longitudinally extending free edge of the other half being formed as a tongue for fitting into the groove. Because the free edges are substantially planar in the longitudinal direction, and do not have projecting pins as in the prior art, longitudinal alignment is simple and requires little effort. Additionally, the shape of the corresponding longitudinal free edges of the frame halves facilitates inward driving of the glue used to couple the halves together towards the interior of the joined halves, thereby reducing the finishing steps of smoothing the frame's exterior surface required before painting the frame.

The above joining method provides a sturdier connection between the frame halves than the connection provided by the prior art methods. Additional reinforcement, however, is also provided by the present invention. In particular, a reinforcing element is preferably provided in the stay area of the frame, i.e., in the seat stay area and the chain stay area. The reinforcing element may take the form of an arch fitted between the elements forming the seat and chain stays. Alternatively, the reinforcing element may be inherent in the design of the inner seat and chain stay elements. Specifically, the inner seat and chain stay elements may be formed as a single piece, preferably with a box element extending into the remainder of the bicycle frame and thus between the outer elements of the seat and chain stays.

BRIEF DESCRIPTION OF THE DRAWINGS

These and other features and advantages of the present invention will be readily apparent from the following detailed description of the invention, the scope of the invention being set out in the appended claims. The detailed description will be better understood in conjunction with the accompanying drawings, wherein like reference characters represent like elements, as follows:

DETAILED DESCRIPTION OF THE INVENTION

Figure 1:
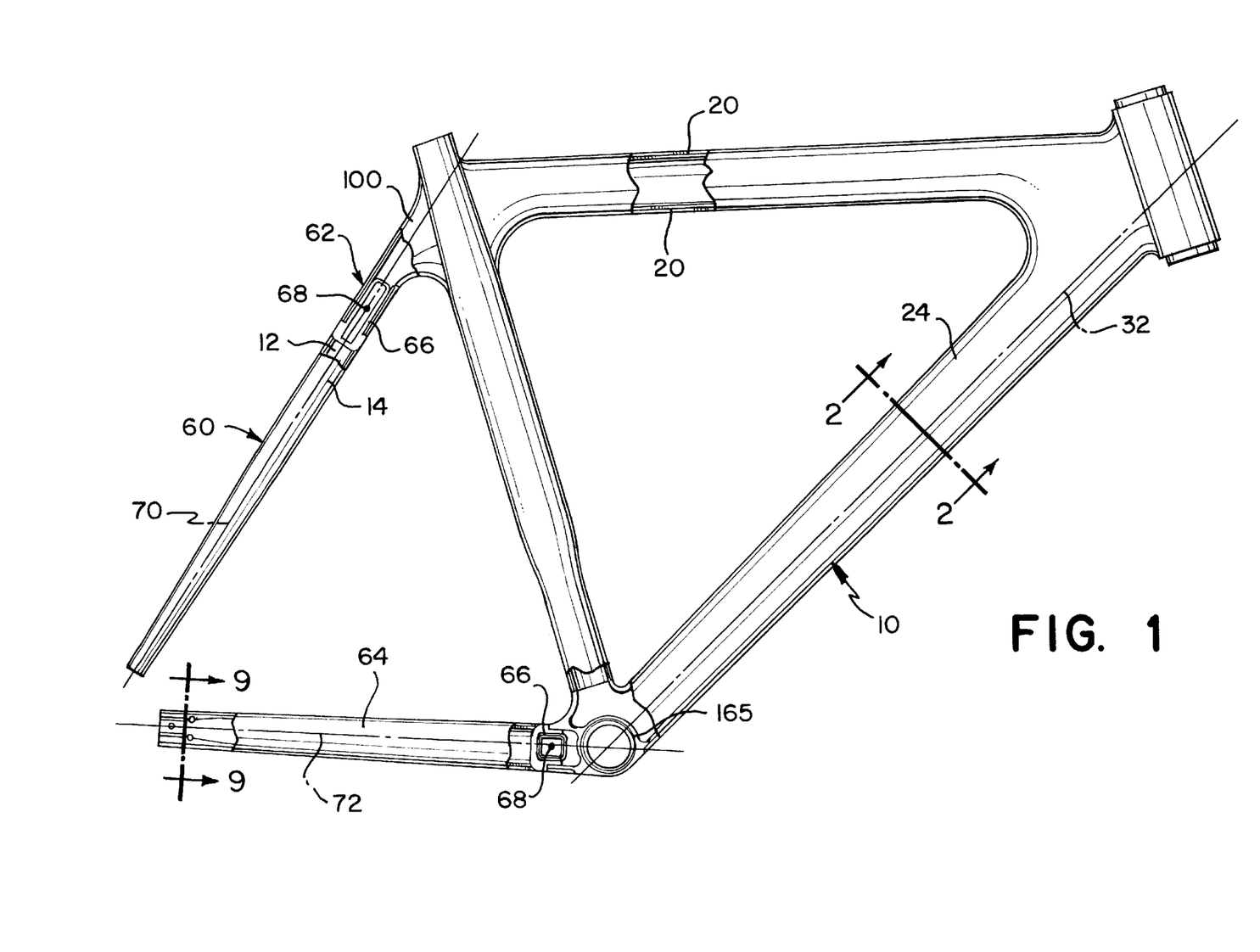
FIG. 1 is a side elevational view of a bicycle frame formed in accordance with the principles of the present invention.

A bicycle frame 10, formed in accordance with the principles of the present invention and having a plurality of intersecting tubular elements with respective intersecting longitudinal axes, is shown in FIG. 1. Frame 10 is formed from left and right half-frames 12, 14 (FIG. 2), each of which is preferably formed from a molded material. Most preferably, the half-frames are formed from injection molded plastic. However, any other desired material may be used, such as fiberglass, carbon fiber, polyurethane, metal (e.g. aluminum or titanium) or reinforced composite materials having, for example, a resin or epoxy matrix. Because the frame is formed by molding the material, the frame must be formed in halves that are later connected to form an integral frame structure. Each frame half has a plurality of interconnected half-tubular elements having respective longitudinal axes, and each half-tubular element of one frame half 12 has a corresponding half-tubular element in the other frame half 14, such that the corresponding half-tubular elements of the half-frames may be coupled together to form a completed bicycle frame 10. Each half-tubular element has an interior surface 16 that is typically concave and an exterior surface 18 that is typically convex, such that connection of corresponding half-tubular elements forms a substantially tubular element. Each half-tubular element has longitudinally extending free edges 20 between interior and exterior surfaces 16, 18 and along which the half-tubular elements are joined. As will be understood, each frame half 12, 14 is preferably a monolithic, one-piece element, such that the formed frame 10 comprises two elements joined to form an integral unit.

In accordance with the principles of the present invention, longitudinal free edges 20 of corresponding half-tubular elements of frame halves 12, 14 are shaped to smoothly interengage with each other and thereby facilitate smooth, easy alignment and joining of the frames halves 12, 14. Specifically, adjoining free edges 20 preferably have multilevel interengaging surfaces, each surface being substantially smooth and planar along longitudinal axis 32 of the respective half-tubular element along which the free edges 20 extend. Thus, free edges 20 do not have projecting elements such as pins that must be carefully aligned with corresponding receiving elements in the edge of the corresponding frame half. Exemplary edge joints are shown in detail in FIGS. 2 and 3.

Figure 2:
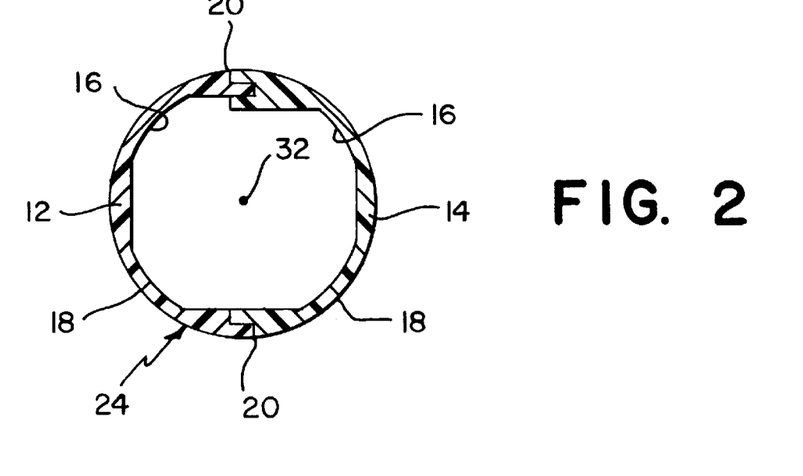
FIG. 2 is a cross sectional view, along line 2—2 of FIG. 1, of a tubular element of the frame of FIG. 1.

A lap splice joint 22 formed in accordance with the principles of the present invention is provided in the lower portion of tubular element 24 (in this case, the down tube of frame 10) shown in FIG. 2. As may be seen in FIG. 3, which shows lap splice joint 22 in greater detail, lap splice joint 22 is formed by shaping the longitudinal free edges 20 to have corresponding stepped surfaces that interengage with each other. "Stepping", as defined herein, is a shape that extends in a direction from a lower step to an upper step, wherein the steps have step surfaces (equivalent to the tread of a step) substantially tangent to the exterior and interior surfaces of the tubular elements. The stepping of the edges is formed in the radial direction such that longitudinal free edges 20 are not planar in the direction extending from the interior surface 16 to the exterior surface 18, yet each stepped surface is substantially smooth and planar in the longitudinal direction.

Figure 3:
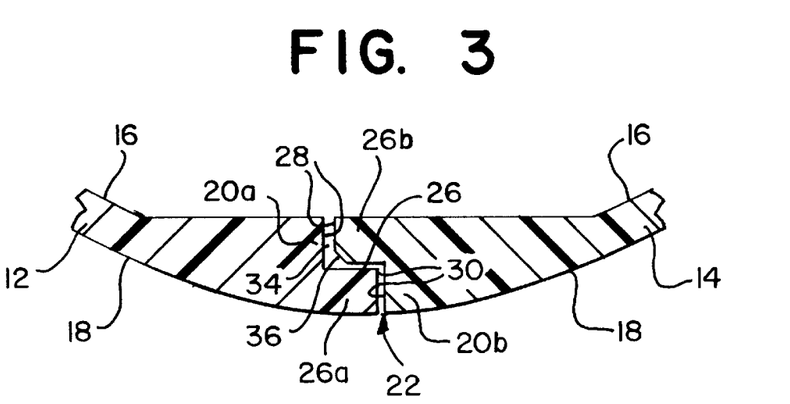
FIG. 3 is an enlarged view of a portion of the cross sectional view of FIG. 2.

Lap splice joint 22 has at least one stepped surface 26 (a "tread") substantially tangent to exterior surface 18 and thus, typically also interior surface 16, an inner substantially radially extending surface 28 (a "riser") between tread 26 and interior surface 16, and an outer substantially radially extending surface 30 (another "riser") between tread 26 and exterior surface 18. The substantially radially extending surface 28 that is closer to interior surface 16 is hereinafter referred to as an "inner riser". The tread 26 may be generally flat in cross-section or curved, e.g., with the same radius as the interior surface 16 and/or the exterior surface 18. Likewise, the substantially radially extending surface 30 that is closer to exterior surface 18 is hereinafter referred to as an "outer riser". Although only one tread 26, positioned between a pair of risers 28, 30, is shown in the figures, it will be understood that additional treads, with the requisite additional risers, may be provided. The treads and risers of stepped longitudinal free edges 20 extend substantially smoothly along longitudinal axis 32. Thus, longitudinal free edges 20 of lap splice joint 22 have at least three substantially planar, transverse surfaces, each surface preferably being substantially perpendicular to its adjoining surface. The surface of the lap joint on respective frame halves may be brought together and slid with respect to each other in the direction of axis 32 for alignment purposes and to relieve stress in the joint.

As may be seen more clearly in FIG. 3, the stepping of longitudinal free edges 20a, 20b of corresponding half-tubular element of frame halves 12, 14 extends in opposite directions such that corresponding longitudinal free edges 20a, 20b may interengage, as described in further detail below, to form completed tubular elements of frame 10. Thus, as shown in FIGS. 2 and 3, the stepping of one longitudinal free edge 20 (in this case, the longitudinal free edge 20a of left half-frame 12) extends from exterior surface 18 to interior surface 16 to form an exterior step 26a having a tread 26 facing interior surface 16, whereas the stepping of the corresponding longitudinal free edge 20 (i.e., longitudinal free edge 20b of the right half-frame 14) extends from interior surface 16 to exterior surface 18 to form an interior step 26b having a tread 26 facing exterior surface 18. In other words, stepped surface 20a faces interior surface 16 and stepped surface 20b faces exterior surface 18. Thus, outer riser 30 precedes interior facing tread 26a, whereas inner riser 28 precedes exterior facing tread 26b. Likewise, interior facing tread 26a is followed by inner riser 28, whereas exterior facing tread 26b is followed by outer riser 30. Because the stepped longitudinal free edge 20a of at least one of the half-tubular elements of one half-frame extends inwardly and the stepped longitudinal free edge 20b of the corresponding half-tubular element in the other half-frame extends outwardly, longitudinal free edges 20a and 20b have corresponding, interengaging shapes.

Each of surfaces 26, 28, 30 is substantially smooth and planar in the longitudinal direction. Accordingly, adjoining edges 20a, 20b of the frame halves 12, 14 that are to be joined together may slide along the longitudinal axis 32 of the respective half-tubular element from which the edges extend, so that alignment of the frame halves 12, 14 requires very little skill or effort. Thus, in order to form frame 10, frame halves 12, 14 may be joined relatively easily, without worrying about aligning elements such as pins, holes, tabs, and slots, such as in the prior art. The exterior surfaces 18 of frame halves 12, 14 are substantially aligned and coextensive at lap splice joint 22, as may be seen in FIGS. 2 and 3, to create a smooth frame exterior.

Another benefit of lap splice joint 22 is that it may be formed to facilitate the flow of glue in the desired direction during connection of the frame halves 12, 14. As may be seen in FIG. 3, the innermost substantially radially extending surfaces of longitudinal free edges 20, in this instance inner risers 28, are preferably spaced apart when frame halves 12, 14 are coupled together. Such spacing is accomplished by forming abutting treads 26 (i.e., treads of corresponding longitudinal free edges 20 that are to be joined together) with different lengths. Preferably, the tread closest to the exterior surface 18 is longer than the tread closest to the interior surface 16, as shown in FIG. 3, so that a gap is formed between the inner risers 28. Thus, in this case, exterior step 26a of frame half 12 is longer than interior step 26b of frame half 14, to thereby form an interior facing gap 34 between the inner substantial radially extending surfaces 28. As may be seen, gap 34 opens to the interior of the tubular element 24 formed upon joining frame halves 12, 14. Thus, glue that is placed between stepped areas 26a, 26b of adjoining free edges 20 more easily flows towards the interior of the tubular element 24, rather than towards the exterior, because of the low resistance to flow permitted by gap 34.

To further facilitate such desired flow of glue, the inner tread 26 (in this case, the tread 26 of interior step 26b of frame half 14, which, as described above, is closer to the interior of tubular element 24 and thus shorter than tread 26 of frame half 12), is chamfered at the intersection between tread 26 and riser 28. Chamfer 36 functions to direct the flow of glue placed between abutting treads 26 towards gap 34, which, in turn, functions as a receptacle for excess glue as well as a conduit for directing glue towards the interior of the frame 10 such that excess glue does not affect the exterior appearance of frame 10. A minimal amount of glue is placed between the outermost substantially radially extending surfaces or risers 30 to minimize the amount of excess glue that is driven towards the exterior of tubular element 24 and which must be cleaned off and smoothed before finishing the bicycle.

Another type of edge joint 40, hereinafter known as a "tongue and groove" joint 40, is particularly useful at high stress areas in frame 10, such as at the upper longitudinal seam (i.e., upper joint) of down tube 42. Tongue and groove joint 40 is provided in the upper portion of tubular element 24 shown in FIG. 2, and is shown in further detail in FIG. 4. As may be seen in these figures, tongue and groove joint 40 is similar to lap splice joint 22 in that each of frame halves 12, 14 has at least one stepped area 26. However, at least one of the frame halves 12, 14 has an additional stepped area 46 extending in a second direction so as to be substantially parallel to and facing the first stepped area 26 such that a groove 48 is formed therebetween. As with lap splice joint 22, the abutting longitudinal free edges 20 of frame halves 12, 14 of tongue and groove joint 40 have abutting inner substantially radially extending surfaces 28 and abutting outer substantially radially extending surfaces 30. However, in order to form an additional stepped area 46, an additional inner substantially radially extending surface 50 must be provided along each longitudinal free edge 20. Surfaces 28 and 30 abut, or at least face each other, upon joining corresponding half-tubular elements together. As may be seen in FIGS. 2 and 4, exterior surfaces 18 of frame halves 12, 14 are substantially aligned and coextensive along tongue and groove joint 40.

Figure 4:
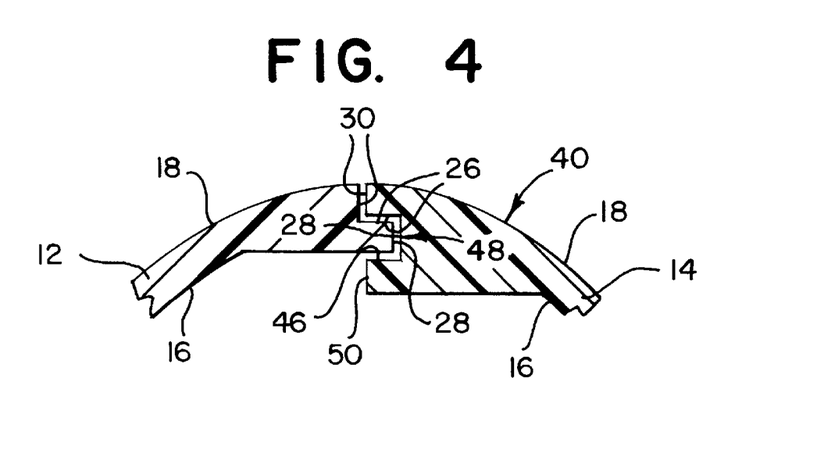
FIG. 4 is an enlarged view of another portion of the cross sectional view of FIG. 2.

Additional stepped area 46, additional inner substantially radially extending surface 50, and interior surface 16 form a wall that provides additional reinforcement for joint 40. Tongue and groove joint 40 thus is particularly beneficial in high stress areas of the bicycle frame 10 because the additional stepped areas provide greater shear area over which the glue used to connect the frame halves may act. However, as is readily apparent from observation, assembly of frame halves 12, 14 with a tongue and groove joint 40 requires more care than that required to assemble lap splice joint 22, even if the latter joint has a plurality of steps (extending in generally the same direction). Thus, it is not particularly desirable to provide more than one pair of stepped areas extending in opposite directions and thus forming more than one groove for receiving a corresponding tongue. Nonetheless, more than one tongue and groove may be provided along either or both sides of any desired half-tubular elements.

Figure 5:
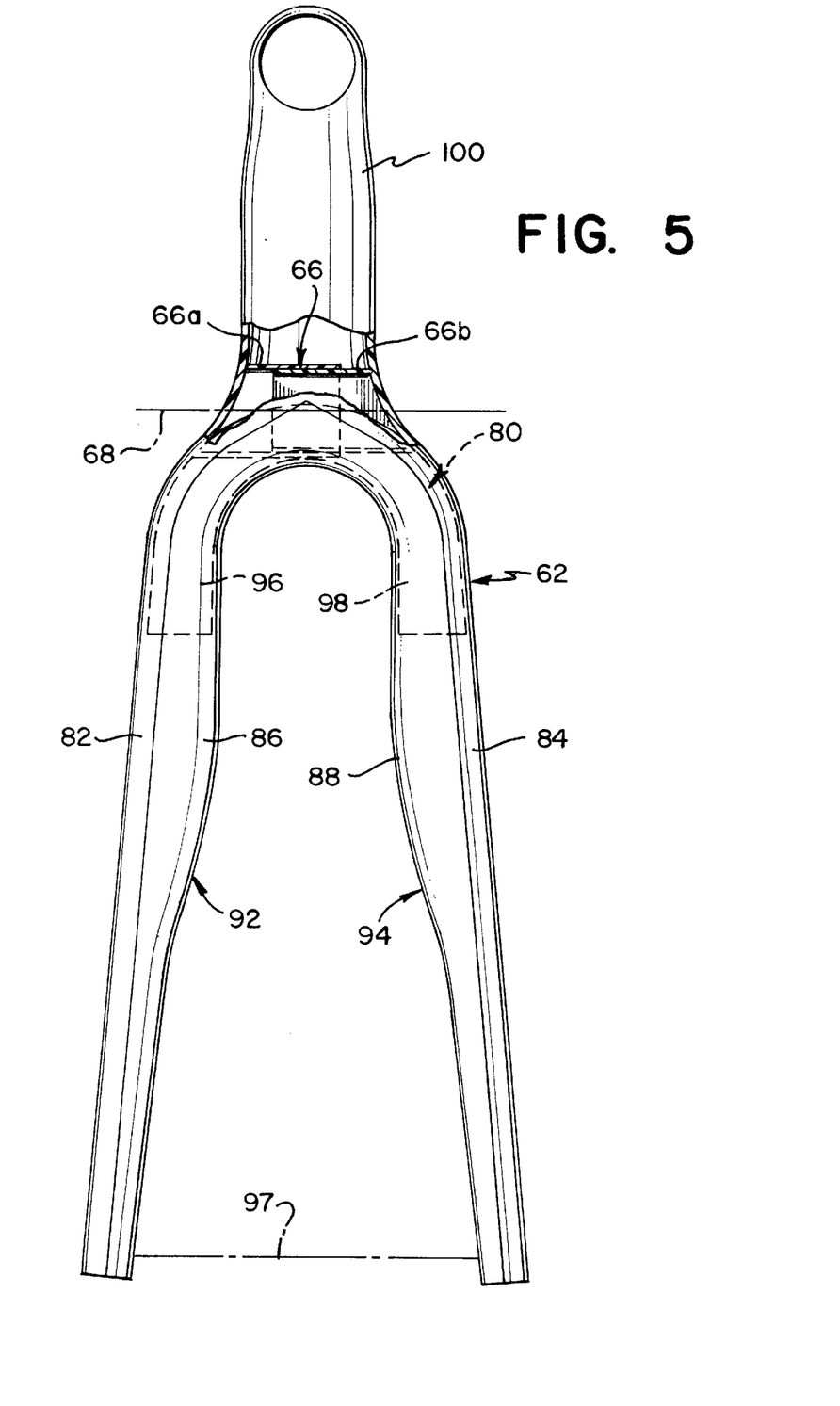
FIG. 5 is an end elevational view of a seat stay having a reinforcement element in accordance with the principles of the present invention.

Another particularly high stress area of the frame 10 is the stay area 60, which includes the seat stay 62, and the chain stay 64. In particular, the area of intersection of the right and left outer seat stay elements (i.e., the respective seat stays of frame halves 12, 14), before the right and left seat stay elements fork apart, is prone to cracking because loads tend to separate the seat stays at the point where they are glued together. The same is true, albeit to a slightly lesser extent, in the chain stay area. Thus, additional reinforcement in the stay area 60, in general, is desirable. In prior art frames, a box 66 is provided in each of seat stay 62 and chain stay 64. Typically, box 66 is formed from corresponding boxes 66a, 66b extending from the interior surface 16 of each of frame halves 12, 14. Corresponding boxes 66a, 66b are shaped so that one fits into the other to form an overlapping box structure 66, as shown in FIG. 5. Box 66 is shown in FIG. 1 as having a substantially square cross section, with a longitudinal axis 68 substantially perpendicular to the respective longitudinal axis 70, 72 of the stay 62, 64 from which box 66 extends. However, the cross section of box 66 may have any other desired shape.

In accordance with the principles of the present invention, the stay area 60 is reinforced such that a box 66 is not necessary because additional reinforcement is provided as shown in FIGS. 5–8. The additional reinforcement of the present invention not only reinforces the high stress stay areas, but also reduces, if not eliminates, cracking in this area.

In the embodiment of FIG. 5, the additional reinforcement is in the form of a substantially continuous reinforcement arch 80. Reinforcement arch 80 is preferably formed from any sturdy material such as injection molded plastic, a plastic composite, fiberglass, carbon fiber, polyurethane, metal or a composite material having a resin or epoxy matrix reinforced with, for example, fiberglass or carbon fiber. As shown in FIG. 5, reinforcement arch 80 is shown positioned within the seat stay elements 62, as described in further detail below. Seat stay 62 is particularly subject to excessive forces from the rear axle of the bicycle and thus benefits from the use of an additional reinforcement element such as a reinforcement arch 80 as formed in accordance with the principles of the present invention. A similar reinforcement arch may be provided in chain stay 64 as well.

Seat stay 62 is formed from left and right outer seat stay elements 82, 84 which, respectively, are a part of left and right frame halves 12, 14, and left and right inner seat stay caps 86, 88. Left and right outer seat stay elements 82, 84 extend from seat tube 83 of frame 10 (FIG. 1) and fork apart to accommodate a rear wheel of the bicycle formed from frame 10. In assembling frame 10 with reinforcement arch 80 in accordance with the principles of the present invention, preferably a portion of box 66 is removed from the stay area to make room for reinforcement arch 80. Reinforcement arch 80 is then glued to interior surface 16 of outer seat stay elements 82, 84. Then, inner stay caps 86, 88 are glued to the other side of reinforcement arch 80 so that seat stay 62 with left and right stay legs 92, 94 is thereby assembled. However, it is not essential that arch 80 be glued to the interior surfaces of each half of the stay legs, as long as at least one half of each of the seat stay legs is glued to arch 80.

Arch 80 has left and right legs 96, 98 which extend into left and right seat stay legs 92, 94 to pick up loads in seat stay legs 92, 94 and absorb excess forces therein, thereby protecting the structural integrity of seat stay 62. Additionally, because arch 80 is glued to the interior surfaces 16 of each part of seat stay legs 92, 94 (i.e., left and right outer seat stay elements 82, 84 and left and right inner seat stay caps 86, 88), shear stresses are absorbed by the arch through the adhesive, and therefore are not passed to the seat stay parts and do not cause the parts to separate or crack. It is noted that the cross section of seat stay legs 92, 94 is not uniform, and typically decreases in size in the direction of the rear wheel axle 97. Additionally, the cross section of seat stay legs 92, 94 is not necessarily circular, but may be oval or square with rounded edges.

Figure 6:
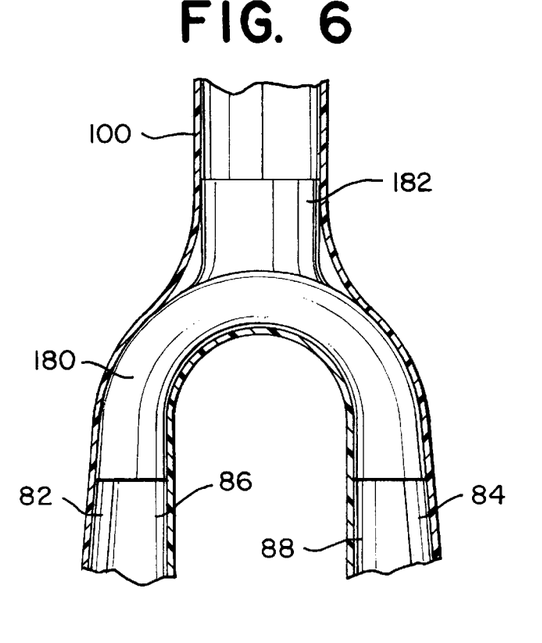
FIG. 6 is an end elevational view of a seat stay, similar to that of FIG. 5, but having a modified reinforcement element.

A modified, Y-shaped reinforcement arch 180 is shown in FIG. 6. Y-shaped reinforcement arch 180 is similar to arch 80 in most respects, but further includes an extension 182 that extends into monostay 100 (the portion of seat stay 62 extending between seat stay legs 92, 94 and seat tube 83). When Y-shaped reinforcement arch 180 is used, extension 182 may extend into the area of monostay 100 in which box 66 is provided. Accordingly, box 66 may be eliminated.

Figure 7:
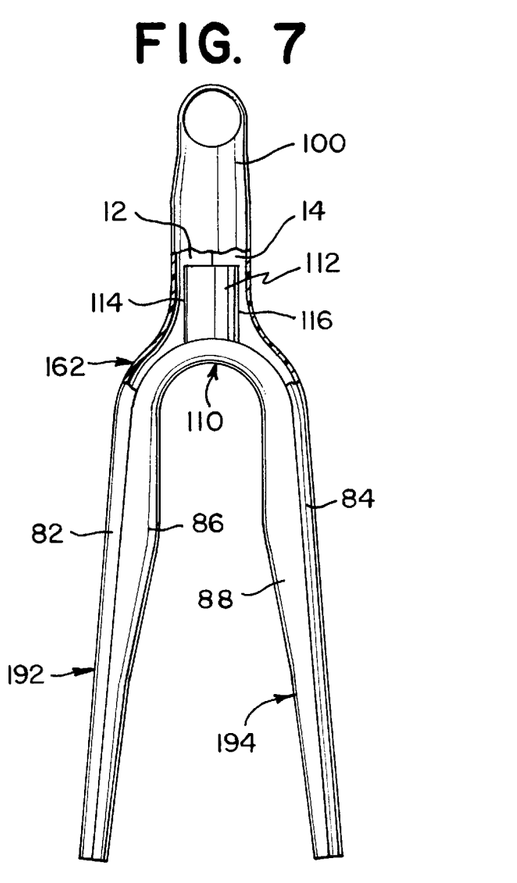
FIG. 7 is an end elevational view of a seat stay having a reinforced inner seat stay in accordance with the principles of the present invention.
Figure 8:
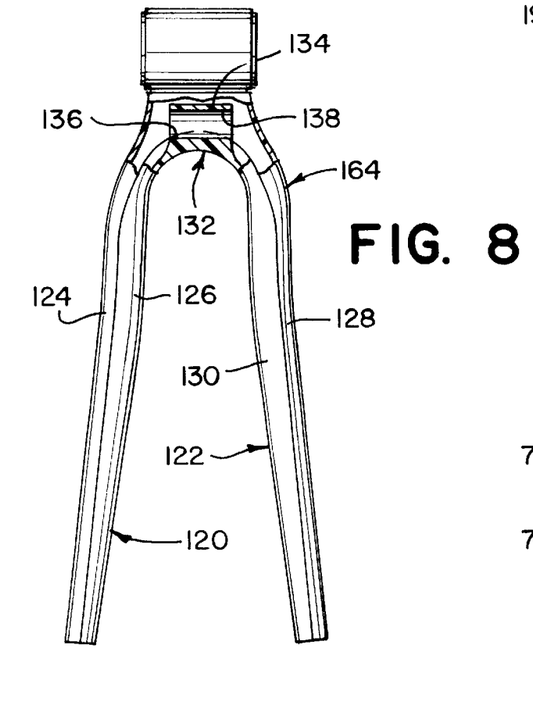
FIG. 8 is an end elevational view of a chain stay having a reinforced inner chain stay similar to the inner seat stay of FIG. 7.

Another solution to reinforcing stay area 60 is shown in FIGS. 7 and 8. In this reinforcement embodiment, the left and right inner stay caps are formed as a single piece. Thus, as shown in FIG. 7, the seat stay 162 formed in accordance with the principles of the present invention has a single-piece inner seat stay cap 110. Preferably, single-piece inner seat stay cap 110 is formed as a unitary, monolithic piece (e.g., by molding as a unit) such that there are no seams between the inner surfaces of left and right seat stay legs 192, 194. Thus, there are no seams along which the excess forces in the seat stay 162 could cause cracking, and no arch 80 or 180 is necessary. Because outer seat stay elements 82, 84 preferably are formed substantially similar to those of seat stay 62 of FIG. 3 (i.e., outer seat stay elements 82, 84 preferably are formed as part of the main frame halves 12, 14), frame 10 has a bonding line along monostay 100 which should be reinforced. Accordingly, single-piece inner seat stay cap 110 preferably further includes an extension 112 which fits within monostay 100 and functions as a reinforcement box similar to box 66. Extension 112 preferably has open sides 114, 116 which reduce the weight of the extension and also facilitate injection molding of the single-piece inner seat stay cap 110. Unlike box 66, extension 112 preferably is formed as a single, unitary piece that is glued to the interior surfaces 16 of the portion of frame halves 12, 14 forming the monostay 100. Extension 112 thus absorbs forces in the seat stay area and reinforces the seat stay area sufficiently to eliminate box 66. Additionally, because extension 112 is formed as part of single-piece inner seat stay cap 110, extension 112 also reinforces single-piece inner seat stay cap 110 by absorbing forces transmitted thereto during riding of the bicycle formed with frame 10.

A single-piece inner stay may also be used in modified chain stay 164, as shown in FIG. 8, which extends from bottom bracket shell 165 (FIG. 1). As in seat stay 162, chain stay 164 has left and right stay legs 120, 122, each formed from an inner and an outer stay element. Specifically, left chain stay leg 120 is formed from a left outer chain stay element 124, formed as a part of left frame half 12, and a left inner chain stay cap 126. Likewise, right chain stay leg 122 is formed from a right outer chain stay element 128, formed as a part of right frame half 14, and a right inner chain stay cap 130. Like single-piece inner seat stay cap 110, left and right inner chain stay caps 126, 130 are preferably formed as a monolithic, unitary piece so that modified chain stay 164 has a single-piece inner chain stay cap 132. Accordingly, there is no seam between left and right inner chain stay caps 126, 130, and thus stresses in the area of chain stay 164 cannot cause cracking between left and right inner chain stay caps 126, 130. Also as in single-piece inner seat stay cap 110, single-piece inner chain stay cap 132 preferably includes an extension 134. Extension 134 is preferably formed with open sides 136, 138, which reduce the weight of the extension, and also facilitate injection molding of the single-piece inner chain stay cap 132. Extension 134 reinforces the bonding line of the left and right frame halves 12, 14 in the area of the chain stay 164 such that a separate box 66 is no longer required. Preferably, extension 134 does not have any seam lines (i.e., is monolithic with single-piece inner chain stay cap 132) and thus reinforces the legs of chain stay cap 132, as described above with respect to single-piece inner seat stay cap 110.

Figure 9:
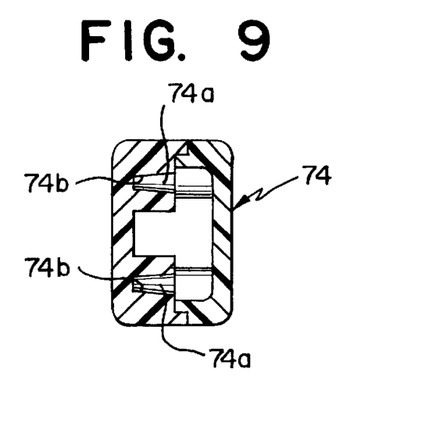
FIG. 9 is a cross-sectional view, along line 9—9 of FIG. 1, of an optional reinforcement element that may be provided in the stay legs of the frame of the present invention.

The above-described stay area reinforcements provide a stronger connection of the stay legs than possible in the prior art. It is preferable to use, nonetheless, either a lap splice joint 22 or a tongue and groove joint 40 along the free edges of the stay elements to secure the connection between these elements, i.e., the connection between the outer stay elements and the inner stay caps. Optionally, reinforcement 74 may also be included, or substituted for, the joint 22 or 40 to further strengthen the connection of the frame halves in the stay area, such as shown in FIGS. 1 and 9. Reinforcement 74, shown in cross-section in FIG. 9, has pins or posts 74a which interlock with corresponding receptacles 74b. Preferably at least two posts 74a and corresponding receptacles 74b are provided on each stay leg, preferably approximately 1 in. (2.54 cm) from the end of the stay leg. Thus, each of the inner and outer stay elements has at least two posts or receptacles. It will be understood that each stay element may have a post and a receptacle, or two of the same reinforcement element (i.e., two posts or two receptacles), or more than two of either reinforcement element, the corresponding stay element having corresponding reinforcement elements. It will further be understood that reinforcement 74 may take on any other desired configuration that provides the desired reinforcement of the stay areas. However, reinforcement 74 may be eliminated and the same effect achieved with an external fastener or clamp located in the same general area.

While the foregoing description and drawings represent the preferred embodiments of the present invention, it will be understood that various additions, modifications and substitutions may be made without departing from the spirit and scope of the present invention as defined in the accompanying claims. In particular, it will be clear that the present invention may be embodied in other specific forms, structures, arrangements, proportions, and with other elements, materials, and components, without departing from the spirit or essential characteristics thereof. One skilled in the art will appreciate that the invention may be used with many modifications of structure, arrangement, proportions, materials, and components and otherwise, used in the practice of the invention, which are particularly adapted to specific environments and operative requirements without departing from the principles of the present invention. In particular, while a bicycle frame is described, the invention extends to other tubular frames, e.g., to a chair, a wheelchair, a storage rack, etc. The presently disclosed embodiments are therefore to be considered in all respects as illustrative and not restrictive, the scope of the invention being indicated by the appended claims, and not limited to the foregoing description.

What is claimed is:

1. A bicycle frame comprising left and right half-frames, each half-frame having a plurality of adjoining half-tubular elements with longitudinal edges joined along a respective longitudinal axis, said longitudinal edges extending along said longitudinal axis between exterior and interior surfaces of said half-tubular elements, each of said half-tubular elements of said left half-frame having a corresponding half-tubular element of said right half-frame, said corresponding left and right half-tubular elements of said half-frames being coupled together to form a plurality of adjoining tubular elements of said frame, said longitudinal edges of each of said left and right half-tubular elements forming a stepped configuration, each half-tubular element including at least one tread substantially tangent to said exterior surface, an inner substantially radially extending surface forming a riser, and an outer substantially radially extending surface forming another riser, said tread being positioned between said risers, one of said left and right half-tubular elements being stepped from said exterior surface towards said interior surface to form an exterior step, and a corresponding half-tubular element being stepped from said interior surface to said exterior surface to form an interior step, said corresponding tubular elements interengaging to form a smooth joint with said exterior surfaces of said corresponding tubular elements being substantially aligned and coextensive at said joint, said tread of said exterior step being longer than said tread of said interior step so that a zap is formed between said inner substantially radially extending surfaces in which adhesive is placed to bond said half tubular elements together, said outer substantially radially extending surfaces abutting each other.

2. A frame as in claim 1, wherein said stepped area of said interior step is chamfered adjacent said inner substantially radially extending surface.

3. A frame as in claim 1, wherein said half-tubular element having said exterior step is stepped in a second direction to form a parallel step facing said exterior step and a groove between said exterior step and said parallel facing step, an interior step of a corresponding half-tubular element fitting within said groove to form a tongue and groove joint between said corresponding left and right half-tubular elements.

4. A frame as in claim 1, wherein each of said left and right half-frames is formed from an injection molded material selected from the group consisting of plastic, plastic composite, fiberglass, carbon fiber, polyurethane, metal, a composite material having a resin matrix, and a composite material having an epoxy matrix.

5. A frame as in claim 1, wherein said exterior surface of each half-tubular element is substantially convex and said interior surface of each half-tubular element is substantially concave.

6. A frame as in claim 1, wherein said exterior surface of each half-tubular element is substantially convex and said interior surface of each half-tubular element is substantially concave, and said tread is substantially convex.

* * * * *